United States Patent
Mukamoto et al.

(10) Patent No.: US 11,627,483 B2
(45) Date of Patent: Apr. 11, 2023

(54) COMMUNICATION DEVICE, COMMUNICATION METHOD, AND COMPUTER PROGRAM PRODUCT FOR MEASURING QUALITY OF LINK

(71) Applicant: KABUSHIKI KAISHA TOSHIBA, Tokyo (JP)

(72) Inventors: Masaki Mukamoto, Kanagawa (JP); Yasuyuki Tanaka, Kanagawa (JP); Sakie Nagakubo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 114 days.

(21) Appl. No.: 17/185,519

(22) Filed: Feb. 25, 2021

(65) Prior Publication Data

US 2022/0070700 A1 Mar. 3, 2022

(30) Foreign Application Priority Data

Aug. 31, 2020 (JP) .............................. JP2020-146345

(51) Int. Cl.
*H04W 24/08* (2009.01)
*H04W 84/18* (2009.01)

(52) U.S. Cl.
CPC ............ *H04W 24/08* (2013.01); *H04W 84/18* (2013.01)

(58) Field of Classification Search
None
See application file for complete search history.

(56) References Cited

U.S. PATENT DOCUMENTS

| 2006/0159038 | A1 | 7/2006 | Hasty, Jr. et al. |
| 2013/0003595 | A1 | 1/2013 | Soomro |
| 2019/0007172 | A1* | 1/2019 | Sakai ................ H04W 72/0446 |
| 2020/0068656 | A1* | 2/2020 | Yang .................... H04W 40/24 |
| 2022/0022212 | A1 | 1/2022 | Tanaka |

FOREIGN PATENT DOCUMENTS

| JP | 4455062 B2 | 4/2010 |
| JP | 5753574 B2 | 7/2015 |
| JP | 2022-20452 A | 2/2022 |

OTHER PUBLICATIONS

T. Winter et al., "RPL: IPv6 Routing Protocol for Low-Power and Lossy Networks," IETF RFC 6550, 157 pages (2012).
X. Vilajosana, et al., "Minimal IPv6 over the TSCH Mode of IEEE 802. 15.4e (6 TiSCH) Configuration," IETF RFC 8180, 28 pages (2017).

* cited by examiner

*Primary Examiner* — Saad Khawar
(74) *Attorney, Agent, or Firm* — Finnegan, Henderson, Farabow, Garrett & Dunner, LLP (57) ABSTRACT

A communication device is connected to a plurality of external communication devices. The communication device includes one or more hardware processors. The processors receive frames transmitted from the plurality of external communication devices at timings prescribed for each of the plurality of external communication devices. The processors calculate, for each of the plurality of external communication devices, an arrival ratio indicating a ratio at which transmitted frames have reached the communication device, based on a number of timings in a measurement period and a number of frames received in the measurement period.

7 Claims, 7 Drawing Sheets

023# COMMUNICATION DEVICE, COMMUNICATION METHOD, AND COMPUTER PROGRAM PRODUCT FOR MEASURING QUALITY OF LINK

CROSS-REFERENCE TO RELATED APPLICATIONS

This application is based upon and claims the benefit of priority from Japanese Patent Application No. 2020-146345, filed on Aug. 31, 2020; the entire contents of which are incorporated herein by reference.

FIELD

Embodiments described herein relate to a communication device, a communication method, and a computer program product.

BACKGROUND

Demand for wireless multi-hop mesh networks is increasing for applications such as sensing in a wide area. This is a technology in which wireless communication devices transfer data in a bucket relay format and communicate with a base station at a specific position. This technology is excellent in terms of installation cost and scalability of the wireless communication devices.

In this technology, in order for each of the wireless communication devices to communicate with the base station, it is necessary to select a wireless communication device to be a data transfer destination from the surrounding wireless communication devices. In addition, it is required to measure quality of a wireless link with the surrounding wireless communication device by some means in order to use it as the selection criterion.

DETAILED DESCRIPTION

According to an embodiment, a communication device is connected to a plurality of external communication devices. The communication device includes one or more hardware processors. The processors receive frames transmitted from the plurality of external communication devices at timings prescribed for each of the plurality of external communication devices. The processors calculate, for each of the plurality of external communication devices, an arrival ratio indicating a ratio at which transmitted frames have reached the communication device, based on a number of timings in a measurement period and a number of frames received in the measurement period.

A preferred embodiment of a communication device according to the present invention will be described in detail below with reference to the accompanying drawings.

As a technology for measuring quality of a link, for example, in order to select a more reliable transfer destination, there is a technology for transmitting a unicast frame for quality inspection to each of the surrounding wireless communication devices and measuring a link packet delivery rate (PDR) from the total number of transmissions of the unicast frame and the number of acknowledgments (ACKs) returned.

In such a technology, because an inspection frame is transmitted to each of the wireless communication devices that are candidates for the transfer destination to measure the quality, it takes a lot of time in an environment where it is possible to communicate with a large number of wireless communication devices. Because application communication with the base station may not be performed until the transfer destination is determined, it is desirable that the quality measurement be performed in the shortest possible time.

As another technology for measuring the quality of the link, there is a technology for estimating the link PDR from a received signal strength indicator (RSSI) of a broadcast frame (wireless signal) received from the surrounding wireless communication device. In this technology, each of the wireless communication devices writes a transmission power value in a frame when advertising its route information in the broadcast frame. The wireless communication device on the receiving side grasps an amount of power attenuation from a difference between the RSSI and the transmission power value written in the frame, and estimates the link PDR using the amount of power attenuation.

In such a technology, because the wireless link is evaluated using the broadcast frame, even if the number of wireless communication devices increases, the link quality evaluation can be performed at a higher speed than the technology using a unicast frame. On the other hand, such a technology does not directly measure the link PDR, but estimates it from the RSSI or the like. Because an RSSI value changes greatly with a slight change in the environment, accuracy of the link PDR estimated based on the RSSI value may be reduced. Generally, in order to calculate the link PDR, the total number of transmissions and the number of successful transmissions are required, but it is difficult to calculate the link PDR because there is no mechanism for returning a response in the broadcast frame.

In any of the above technologies, the quality is measured in an environment where other wireless communication devices in the network are communicating. That is, the measurement is performed in a situation where the link quality is likely to vary due to interference with other communications. Therefore, long-term measurement is required to obtain more accurate measurement results.

Therefore, in the present embodiment, each of the wireless communication devices transmits a quality measurement frame (measurement frame) at an occupancy timing in which only the wireless communication device performs transmission. The occupancy timing represents a transmission timing prescribed for each of the wireless communication devices 100 so as not to cause communication interference. By sharing the occupancy timing between a transmitter and a receiver, the total number of measurement frames transmitted can be calculated. That is, more accurate link PDR measurement can be performed in a short time.

Figure 1:
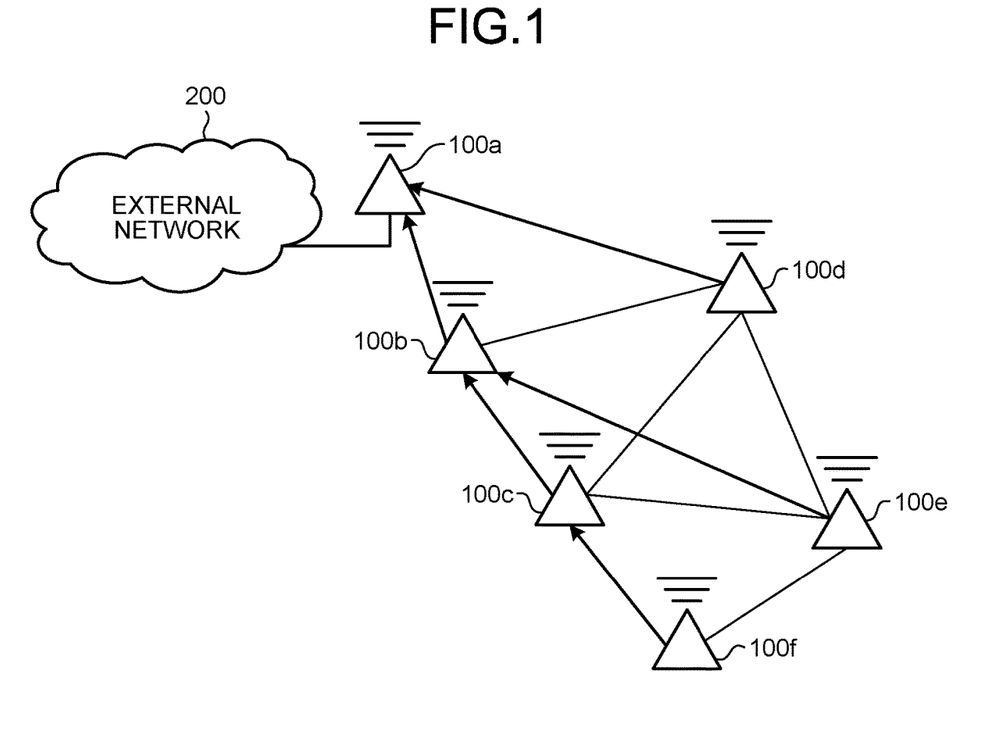
FIG. 1 is a diagram illustrating a configuration example of a communication system including wireless communication devices according to an embodiment.

FIG. 1 is a diagram illustrating a configuration example of a communication system including the wireless communication devices (an example of a communication device) according to the present embodiment. As illustrated in FIG. 1, the communication system includes a plurality of wireless communication devices 100a, 100b, 100c, 100d, 100e, and 100f. Because the wireless communication devices 100a, 100b, 100c, 100d, 100e, and 100f can have the same configuration, they are simply referred to as the wireless communication devices 100 when it is not necessary to distinguish them. The number of wireless communication devices 100 is not limited to six.

The wireless communication devices 100 form a wireless multi-hop mesh network. Each wireless communication device 100 has a function of performing time division multiplex communication. For multi-hop communication, each of the wireless communication devices 100 measures quality of radio waves arriving at itself from other wireless communication devices 100 (external communication devices) within its own communication range, and selects at least one wireless communication device 100 to be a data transfer destination.

The data to be transferred may be any data, and may be, for example, sensing information obtained from a sensor included in each of the wireless communication devices 100. FIG. 1 illustrates an example in which each of the wireless communication devices 100 transmits the data (sensing information or the like) to an external network 200. Each wireless communication device 100 selects one transfer destination in order to transmit its own sensing information to the wireless communication device 100 (wireless communication device 100a in FIG. 1) connected to the external network 200.

Because each of the wireless communication devices 100 measures the quality by the radio waves that reach itself, it is more efficient to perform the measurement using a broadcast frame whose destination is all the other wireless communication devices 100 within the communication range. Therefore, in the present embodiment, in principle, the quality of the link is measured by using the broadcast frame as the measurement frame.

Figure 2:
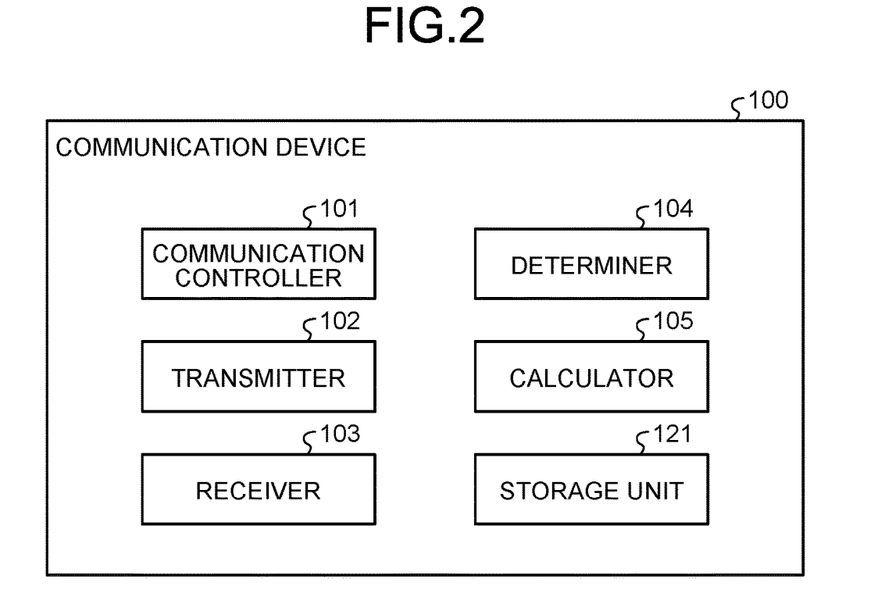
FIG. 2 is a block diagram of the wireless communication device according to the embodiment.

FIG. 2 is a block diagram illustrating an example of the configuration of the wireless communication device 100 according to the present embodiment. As illustrated in FIG. 2, the wireless communication device 100 includes a communication controller 101, a transmitter 102, a receiver 103, a determiner 104, a calculator 105, and a storage unit 121.

The storage unit 121 stores various data used in various processes performed by the wireless communication device 100. For example, the storage unit 121 stores information indicating a schedule of the time division multiplex communication. The time division multiplex communication schedule includes occupancy timing information indicating the timing at which each of the wireless communication devices 100 transmits the measurement frame.

Figure 3:
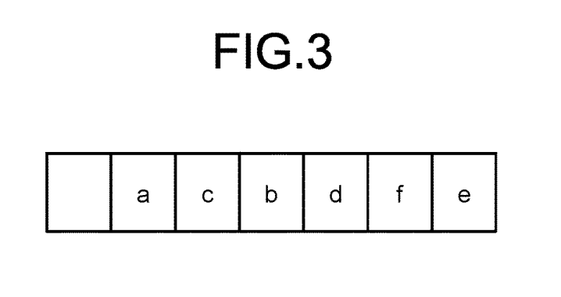
FIG. 3 is a diagram illustrating an example of an occupancy timing.

FIG. 3 is a diagram illustrating an example of the occupancy timing. a to f in FIG. 3 correspond to the wireless communication devices 100a to 100f, respectively. FIG. 3 illustrates an example in which the occupancy timing is allocated to six of seven time slots in the order of the wireless communication devices 100a, 100c, 100b, 100d, 100f, and 100e. Each wireless communication device 100 stores information indicating such an occupancy timing in the storage unit 121, and controls the transmission of the measurement frame and waiting for reception according to the occupancy timing.

In an example of FIG. 3, each of the wireless communication devices 100 transmits the measurement frame with a cycle of seven time slots. For example, the wireless communication device 100a transmits the measurement frame in a second time slot. The wireless communication devices 100b and 100d within the communication range of the wireless communication device 100a grasp such occupancy timing, and each wait for reception in the second time slot. Furthermore, at the occupancy timing of a certain wireless communication device 100, the other wireless communication devices 100 in the network do not perform transmission. Therefore, communication interference in the network does not occur at this occupancy timing.

An example of a method of allocating the occupancy timing to each of the wireless communication devices 100 will be described below. For example, when 6TiSCH is used as a communication protocol, the occupancy timing can be allocated by the following method.

(A1) Each wireless communication device 100 determines the occupancy timing in an autonomous and distributed manner while grasping the occupancy timings of the surrounding wireless communication devices 100.

(A2) One wireless communication device 100 (for example, a root node connected to the external network 200, the wireless communication device 100a in FIG. 1) centrally determines the occupancy timings of the wireless communication devices 100.

Although it is possible to allocate the occupancy timing by either method, it is easier to perform allocation by the method of centrally determining the occupancy timings.

The storage unit 121 may include any commonly used storage medium such as a flash memory, a memory card, a random access memory (RAM), a hard disk drive (HDD), and an optical disk.

Returning to FIG. 2, the communication controller 101 controls communication with other wireless communication devices 100 or the like. For example, the communication controller 101 controls the time division multiplex communication according to a schedule prescribed for the time division multiplex communication. Furthermore, when measuring the quality of the link, the communication controller 101 controls transmission and reception of the measurement frame or the like according to the occupancy timing as described above.

For example, the communication controller 101 controls the transmitter 102 to transmit the measurement frame at the occupancy timing at which the communication controller 101 transmits the measurement frame. Furthermore, the communication controller 101 controls the transmitter 102 not to transmit the measurement frame at the occupancy timing when the other wireless communication devices 100 transmit the measurement frame, and waits for reception of the measurement frame transmitted from the other wireless communication devices 100. The communication controller 101 outputs information obtained from the received measurement frame to the determiner 104 and the calculator 105.

The communication controller 101 repeatedly performs the transmission of the measurement frame and the waiting for reception within a measurement period. The measurement period includes an initial measurement period and a final measurement period. The initial measurement period is a predetermined measurement period (first measurement period). The final measurement period is a measurement period determined by the determiner 104 based on the quality of the link obtained from the measurement frame measured in the initial measurement period. Details of a method for determining the final measurement period by the determiner 104 will be described below.

The transmitter 102 transmits various data to another wireless communication device 100 or the like under the control of the communication controller 101. For example, the transmitter 102 transmits the measurement frame at its own occupancy timing.

The receiver 103 receives various data from another wireless communication device 100 or the like under the control of the communication controller 101. For example, the receiver 103 receives the measurement frame transmitted at the occupancy timing of another wireless communication device 100.

The determiner 104 determines the final measurement period and the data transfer destination. The determiner 104 determines the final measurement period from the measurement frame received within a predetermined initial measurement period. The final measurement period is a period that starts at the same time as the initial measurement period and ends at an extended time of an end time of the initial measurement period. Therefore, determining the final measurement period corresponds to determining an end time of the measurement period.

The determiner 104 determines the final measurement period for each of the wireless communication devices 100 according to the quality of the link between the wireless communication devices 100. Note that the determiner 104 may determine the final measurement period common to the wireless communication devices 100.

The determiner 104 estimates the quality of the link with reference to the information contained in the received measurement frame, and determines the final measurement period according to the estimated quality. The information to be referred to may be any information, and a method for determining the transfer destination can be changed depending on which information is used.

For example, the determiner 104 estimates an average value of the received signal strength indicator (RSSI) of the measurement frames that have been successfully received as the quality of the link. The determiner 104 determines the final measurement period such that the higher the average value is, the shorter the final measurement period is. This makes it possible to evaluate a link that is likely to have a high link PDR in a short time.

The determiner 104 may estimate variance of the RSSI of the measurement frames that have been successfully received as the quality of the link. The determiner 104 determines the final measurement period such that the higher a variance value is, the longer the final measurement period is. Thus, the measurement period for a link having an unstable radio wave environment can be increased, and the link PDR can be calculated more accurately.

Figure 4:
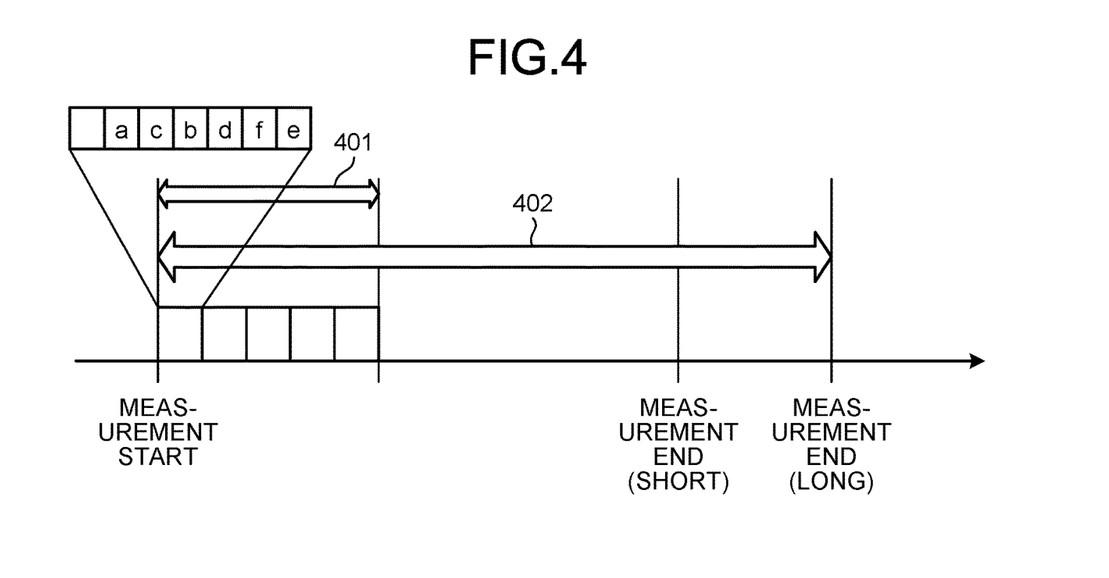
FIG. 4 is a diagram illustrating an example of a measurement period.

FIG. 4 is a diagram illustrating an example of the measurement period. When each of the wireless communication devices 100 starts measurement, it waits for reception in an initial measurement period 401 and collects the measurement frames. The initial measurement period 401 includes time slots of a plurality of cycles. In an example of FIG. 4, the initial measurement period 401 includes five cycles of the seven time slots. After collecting the measurement frames in the initial measurement period, the determiner 104 determines a final measurement period 402 indicating how long it will finally take to perform the measurement with reference to the information of the collected measurement frames. Depending on the quality of the link estimated from the collected measurement frames, the final measurement period 402 may be shorter (measurement end "short") or longer (measurement end "long").

The determiner 104 transmits the determined final measurement period to the communication controller 101. The communication controller 101 controls each unit to perform the measurement by the measurement frame until the end time of the final measurement period.

The calculator 105 calculates the link PDR using the measurement frame received by the end time of the final measurement period. The link PDR corresponds to an arrival ratio indicating a ratio at which the measurement frames transmitted from another wireless communication device 100 have reached itself. For example, the calculator 105 calculates the link PDR for each of the other wireless communication devices 100 based on the number of occupancy timings in the final measurement period and the number of measurement frames received in the final measurement period. For example, the link PDR can be calculated from the number of measurement frames received from each of the wireless communication devices 100 within the final measurement period with respect to the number of occupancy timings within the final measurement period.

The determiner 104 determines, based on the calculated link PDR, at least one wireless communication device 100 as a destination to which the data is transferred.

Each of the above units (communication controller 101, transmitter 102, receiver 103, determiner 104, and calculator 105) is implemented by, for example, one or more processors. For example, each of the above units may be implemented by causing a processor such as a central processing unit (CPU) to execute a computer program, that is, by software. Each of the above units may be implemented by a processor such as a dedicated integrated circuit (IC), that is, by hardware. Each of the above units may be implemented by using software and hardware in combination. When a plurality of processors are used, each processor may implement one of the units, or may implement two or more of the units.

Figure 5:
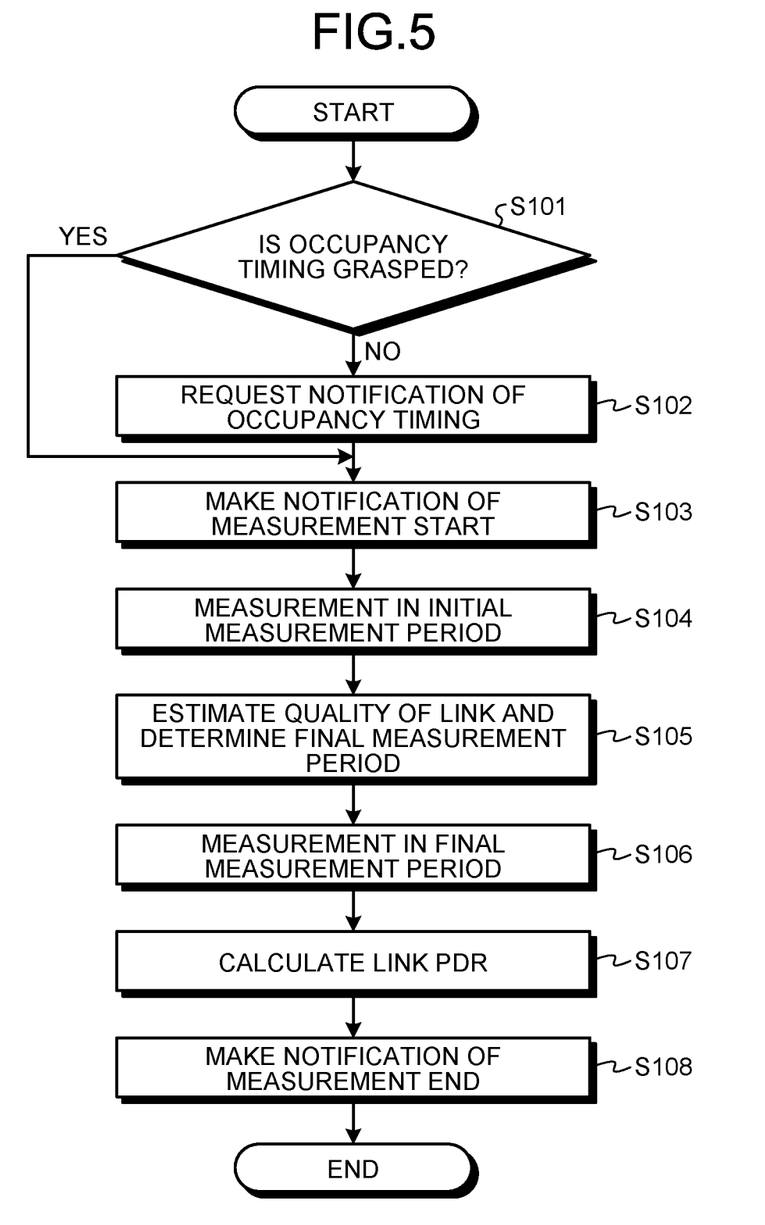
FIG. 5 is a flowchart of a measurement process.
Figure 6:
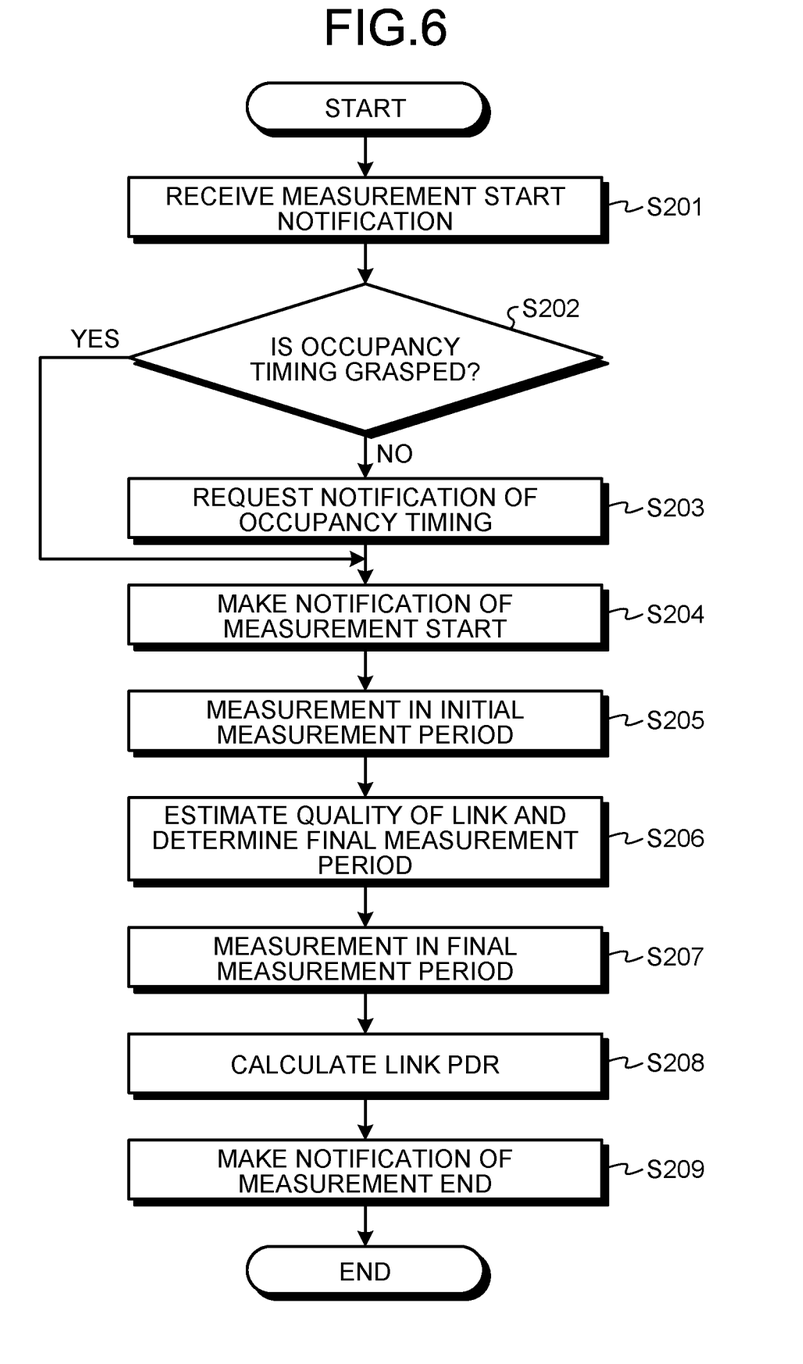
FIG. 6 is a flowchart of a measurement process.

Next, a measurement process by the wireless communication devices 100 according to the present embodiment configured in this way will be described. FIGS. 5 and 6 are flowcharts illustrating an example of the measurement process in the present embodiment. The measurement process of FIGS. 5 and 6 is a process performed by the wireless communication device 100 on the receiving side that receives the measurement frame and calculates the link PDR.

The measurement process includes an active measurement process and a passive measurement process. In the active measurement process, the wireless communication device 100 itself determines a start of the measurement, and calls the surrounding wireless communication device 100 for measurement communication. On the other hand, in the passive measurement process, the wireless communication device 100 determines the start of the measurement in response to a start of the measurement communication for which notification is made from the surrounding wireless communication device 100.

FIG. 5 illustrates an example of the active measurement process. The wireless communication device 100 first determines whether the occupancy timing of another wireless communication device 100 to be measured is grasped (Step S101). When the occupancy timing cannot be grasped (No at Step S101), the communication controller 101 transmits a request frame requesting notification of the occupancy timing to the wireless communication device 100 to be measured (Step S102).

When the occupancy timing is grasped (Yes at Step S101), and after the occupancy timing of the wireless communication device 100 to be measured can be grasped after transmitting the request frame, the communication controller 101 notifies the surrounding wireless communication device 100 of the start of the measurement (Step S103), and prompts the surrounding wireless communication device 100 to transmit the measurement frame.

Thereafter, the communication controller 101 performs the measurement in the initial measurement period (Step S104). For example, the communication controller 101 controls the receiver 103 to receive the measurement frame in the initial measurement period.

The determiner 104 estimates the quality of the link based on the measurement frame received in the initial measurement period, and determines the final measurement period from an estimation result (Step S105). The communication controller 101 performs the measurement in the final measurement period (Step S106).

The calculator 105 calculates the link PDR from the number of measurement frames successfully received in the final measurement period and the number of occupancy timings in the final measurement period (Step S107). The communication controller 101 notifies the wireless communication device 100 to be measured of a measurement end (Step S108), and ends the measurement process.

FIG. 6 illustrates an example of the passive measurement process. In the passive measurement process, the communication controller 101 receives a measurement start notification from the surrounding wireless communication device 100 (Step S201). After receiving this notification, a process corresponding to FIG. 5 is started. Steps S202 to S209 correspond to Steps S101 to S108 of FIG. 5.

Figure 7:
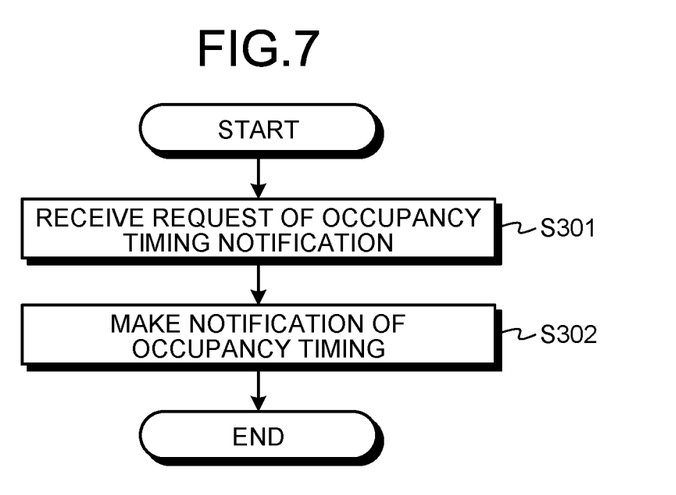
FIG. 7 is a flowchart of a timing notification process.

Next, a process of the wireless communication device 100 (transmitting side) to be measured will be described. FIG. 7 is a flowchart illustrating an example of timing notification process performed by the wireless communication device 100 to be measured.

The communication controller 101 receives the request frame requesting notification of the occupancy timing (Step S301). When the communication controller 101 receives the request frame, it transmits information indicating its own occupancy timing to the wireless communication device 100 that is a transmission source of the request frame (Step S302), and ends the timing notification process. The information indicating the occupancy timing is, for example, information indicating a time slot for transmitting the measurement frame.

Figure 8:
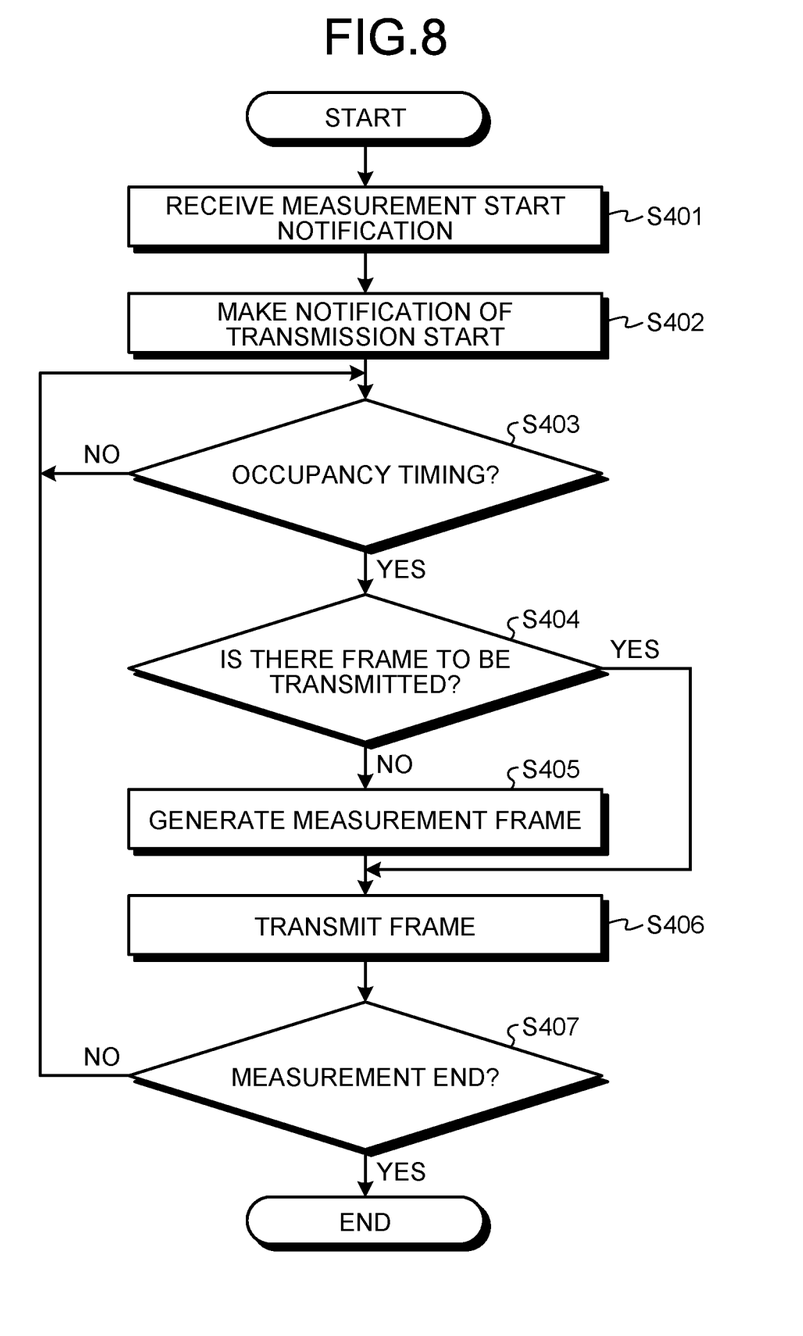
FIG. 8 is a flowchart of a transmission process for transmitting a measurement frame.

FIG. 8 is a flowchart illustrating an example of a transmission process for transmitting the measurement frame.

The communication controller 101 receives the measurement start notification from the wireless communication device 100 on the receiving side (Step S401). The communication controller 101 notifies not only the wireless communication device 100 that is the transmission source of the received notification, but also other surrounding wireless communication devices 100 that it starts transmitting the measurement frame (Step S402).

The communication controller 101 determines whether it has reached its own occupancy timing (Step S403), and if it has not reached its own occupancy timing (No at Step S403), it waits until it reaches its own occupancy timing.

When it has reached its own occupancy timing (Yes at Step S403), the communication controller 101 confirms, for example, a transmission queue for storing data waiting to be transmitted, and determines whether there is a frame (broadcast frame or the like) other than the measurement frame to be transmitted for application or network management (Step S404). When there is no frame (No at Step S404), the communication controller 101 generates the measurement frame (Step S405).

When a frame other than the measurement frame exists (Yes at Step S404), and after the measurement frame is generated, the communication controller 101 transmits the frame other than the measurement frame or the measurement frame (Step S406). The frame other than the measurement frame is, for example, a broadcast frame, but may be a unicast frame.

The communication controller 101 determines whether the measurement is completed (Step S407), and if the measurement is not completed (No at Step S407), it waits until a next occupation timing is reached and repeats the process. The communication controller 101 determines that the measurement is completed, for example, when it receives a measurement end notification from all the other wireless communication devices 100 that have made notification of the start of the measurement, or when a timeout time has elapsed. When the measurement is completed (Yes at Step S407), the transmission process is completed.

First Modification

The method of allocating the occupancy timing to each of the wireless communication devices 100 is not limited to the above example. For example, when Low Power Multihop Network (LPMN) is used as the communication protocol, the occupancy timing can be allocated by the following method.

(B1) A communication cycle is set longer than the number of wireless communication devices 100, and the occupancy timing is allocated based on unique device information of each of the wireless communication devices 100. Thus, duplication of occupancy timings of the wireless communication devices 100 can be completely prevented.

Next, a case where Wi-SUN FAN is used as the communication protocol will be described. In Wi-SUN FAN, each of the wireless communication devices 100 has a schedule for the measurement frame, and can grasp the occupancy timing of each other by notifying each other of the schedule. Therefore, the occupancy timing can be allocated by the following method.

(B2) The schedule of the measurement frame of each of the wireless communication devices 100 is unified to the schedule of a certain wireless communication device 100, for example, the root node (wireless communication device 100*a* in FIG. 1) connected to the external network. In this schedule, the occupancy timings of the wireless communication devices 100 are allocated not to overlap each other.

Second Modification

The method for determining the final measurement period is not limited to the above, and the following methods can also be used.

(C1) When the wireless communication device 100 is driven by a battery, a shorter final measurement period is determined for the wireless communication device 100 having a lower battery level. Thus, the power consumed for the link quality measurement process can be reduced, and the application can be provided for a longer period of time.

(C2) The link PDR at the end of the initial measurement period is compared with the link PDR at the end of the final measurement period at the time of the previous measurement, and the closer the two values are, the shorter the final measurement period is determined. If the two values are close, it can be interpreted that the radio wave environment is stable. Therefore, when the radio wave environment is stable, it is possible to perform measurement in a short period of time while ensuring a certain degree of accuracy.

(C3) The final measurement period is determined based on routing information transmitted and received on a multi-hop routing protocol.

An example of the routing information in the above (C3) will be described. For example, in RPL, each of the wireless communication devices 100 advertises a path cost for the root node called a rank in the broadcast frame. A value of this rank (rank value) is an example of the routing information. It is desirable that each of the wireless communication devices 100 (determiner 104) transfer a message whose routing is not specified to the wireless communication device 100 having a lower rank value than itself, with reference to the rank value received from the surrounding wireless communication devices 100.

Generally, it is considered that the wireless communication device 100 having a lower rank value is a useful transfer destination having features such as a shorter delay time until reaching the root node and a lower path loss rate. Therefore, the determiner 104 determines the longer final measurement period for the link having the lower rank value based on the rank value of the surrounding wireless communication device 100 obtained within the initial measurement period. This makes it possible to extract the wireless communication device 100 that is likely to be selected as the transfer destination and measure the quality of the link more accurately for the extracted wireless communication device 100.

As described above, in the communication device according to the present embodiment, the optimum measurement period can be determined according to the quality of the wireless link, and the quality of the link can be measured with higher accuracy in a shorter time.

Figure 9:
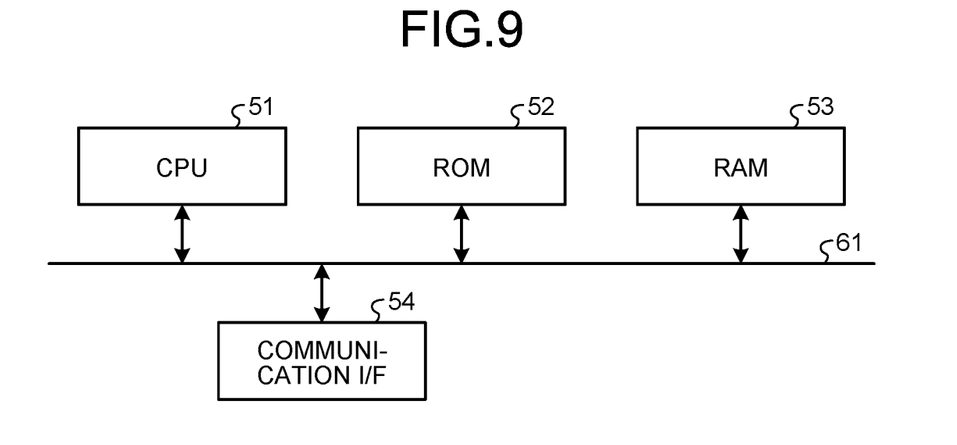
FIG. 9 is a hardware configuration diagram of the communication device according to the embodiment.

Next, a hardware configuration of the communication device according to the embodiment will be described with reference to FIG. 9. FIG. 9 is an explanatory diagram illustrating a hardware configuration example of the communication device according to the embodiment.

The communication device according to the embodiment includes a control device such as a central processing unit (CPU) 51, a storage device such as a read only memory (ROM) 52 or a random access memory (RAM) 53, a communication I/F 54 for performing communication via a network connection, and a bus 61 for connecting the units.

The computer program executed by the communication device according to the embodiment is provided by being incorporated in the ROM 52 or the like in advance.

The computer program executed by the communication device according to the embodiment may be configured to be provided as a computer program product by storing a file in an installable format or an executable format on a computer-readable storage medium such as a compact disc read only memory (CD-ROM), a flexible disk (FD), a compact disc recordable (CD-R), or a digital versatile disc (DVD).

Furthermore, the computer program executed by the communication device according to the embodiment may be configured to be stored on a computer connected to a network such as the Internet, and provided by downloading via the network. Furthermore, the computer program executed by the communication device according to the embodiment may be configured to be provided or distributed via a network such as the Internet.

The computer program executed in the communication device according to the embodiment can make the computer function as each unit of the communication device described above. In the computer, the CPU 51 can read a computer program from a computer-readable storage medium onto a main storage device and execute the computer program.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication device that is connected to a plurality of external communication devices, comprising:
one or more hardware processors configured to:
    receive frames transmitted from the plurality of external communication devices at timings prescribed for each of the plurality of external communication devices;
    calculate, for each of the plurality of external communication devices, an arrival ratio indicating a ratio at which transmitted frames have reached the communication device, based on a number of timings in a measurement period and a number of frames received in the measurement period; and
    estimate quality of communication with each of the plurality of external communication devices based on a frame received within a first measurement period included in the measurement period, and determine an end time of the measurement period based on the estimated quality.

2. The device according to claim 1, wherein the quality is a received signal strength indicator of a wireless signal used for communication.

3. The device according to claim 1, wherein the one or more hardware processors calculate the arrival ratio as a ratio of a number of frames received to the number of timings within the measurement period.

4. The device according to claim 1, wherein the one or more hardware processors configured to:
control to transmit no frame to the plurality of external communication devices at the timings.

5. The device according to claim 1, wherein the one or more hardware processors configured to:
determine, as a destination to which data is to be transferred, one or more external communication devices from the plurality of external communication devices, based on the calculated arrival ratio.

6. A communication method to be performed by a communication device that is connected to a plurality of external communication devices, comprising:
receiving frames transmitted from the plurality of external communication devices at timings prescribed for each of the plurality of external communication devices;
calculating, for each of the external communication devices, an arrival ratio indicating a ratio at which transmitted frames have reached the communication device, based on a number of timings in a measurement period and a number of frames received in the measurement period; and
estimating quality of communication with each of the plurality of external communication devices based on a frame received within a first measurement period included in the measurement period, and determining an end time of the measurement period based on the estimated quality.

7. A computer program product having a non-transitory computer readable medium including programmed instructions, wherein the instructions, when executed by a computer, cause the computer to perform:

receiving frames transmitted from the plurality of external communication devices at timings prescribed for each of the plurality of external communication devices;

calculating, for each of the external communication devices, an arrival ratio indicating a ratio at which transmitted frames have reached the communication device, based on a number of timings in a measurement period and a number of frames received in the measurement period; and estimating quality of communication with each of the plurality of external communication devices based on a frame received within a first measurement period included in the measurement period, and determining an end time of the measurement period based on the estimated quality.

* * * * *